(12) United States Patent
Lin et al.

(10) Patent No.: US 12,386,222 B2
(45) Date of Patent: Aug. 12, 2025

(54) DISPLAY DEVICE

(71) Applicant: InnoLux Corporation, Miao-Li County (TW)

(72) Inventors: Hsiao-Lang Lin, Miao-Li County (TW); Tsung-Han Tsai, Miao-Li County (TW); Jia-Yuan Chen, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 195 days.

(21) Appl. No.: 17/885,566

(22) Filed: Aug. 11, 2022

(65) Prior Publication Data

US 2022/0382108 A1 Dec. 1, 2022

Related U.S. Application Data

(63) Continuation of application No. 15/893,707, filed on Feb. 12, 2018, now abandoned.

(51) Int. Cl.
*G02F 1/13357* (2006.01)
*G02F 1/1335* (2006.01)

(52) U.S. Cl.
CPC .. *G02F 1/133608* (2013.01); *G02F 1/133528* (2013.01); *G02F 1/133555* (2013.01); *G02F 1/133603* (2013.01); *G02F 1/133614* (2021.01); *G02F 2201/50* (2013.01); *G02F 2202/36* (2013.01)

(58) Field of Classification Search
CPC ......... G02F 1/133608; G02F 1/133528; G02F 1/133555; G02F 1/133603; G02F 1/133614; G02F 2201/50; G02F 2202/36; G02F 1/133557; G02F 2201/307; G02F 1/133611; G02F 1/133612

See application file for complete search history.

(56) References Cited

U.S. PATENT DOCUMENTS

| | | | |
|---|---|---|---|
| 6,636,286 B1 * | 10/2003 | Baek | G02F 1/133514 349/114 |
| 2014/0168949 A1 * | 6/2014 | Zhao | G02B 6/0021 362/97.3 |
| 2016/0033715 A1 * | 2/2016 | Lee | G02B 6/0073 257/89 |
| 2016/0381317 A1 * | 12/2016 | Hosoki | G02B 6/0068 349/65 |

(Continued)

*Primary Examiner* — Jennifer D. Carruth
*Assistant Examiner* — Agnes Dobrowolski
(74) *Attorney, Agent, or Firm* — Winston Hsu

(57) ABSTRACT

A display device includes a backlight module and a display module. The backlight module includes a plurality of light emitting units, a base plate and at least one controller. The light emitting units are disposed on a first surface of the base plate, the controller is disposed on a second surface of the base plate, the second surface is opposite to the first surface, and at least one of the light emitting units is electrically connected to the controller. The display module is disposed on the first surface, and the light emitting units are disposed between the display module and the base plate. The backlight module includes a covering layer, an optical film, and a plurality of pins, the covering layer is disposed on the first surface of the base plate, and the pins are disposed between the covering layer and the optical film.

22 Claims, 9 Drawing Sheets

(56) References Cited

U.S. PATENT DOCUMENTS

| | | | |
|---|---|---|---|
| 2017/0045778 A1* | 2/2017 | Cheng | G02F 1/1337 |
| 2018/0080625 A1* | 3/2018 | Yamada | F21V 7/0083 |
| 2018/0180942 A1* | 6/2018 | Peterson | G02F 1/133603 |
| 2018/0188606 A1* | 7/2018 | Lee | G02F 1/133608 |
| 2018/0210282 A1* | 7/2018 | Song | G02F 1/133514 |

* cited by examiner

DISPLAY DEVICE

CROSS REFERENCE TO RELATED APPLICATIONS

This application is a continuation application of U.S. application Ser. No. 15/893,707, filed on Feb. 12, 2018. The content of the application is incorporated herein by reference.

BACKGROUND OF THE DISCLOSURE

1. Field of the Disclosure

The present disclosure relates to a display device, and more particularly, to a display device including light emitting units having a wide spray angle.

2. Description of the Prior Art

Flat panel display devices, such as liquid crystal display (LCD), inorganic light-emitting diode (LED) display, organic light-emitting diode (OLED) display, and electroluminescent display (ELD), are information viewing technologies for widespread use in a variety of electronic apparatuses, as the characteristics of thinness, light weight and low dissipation power are widely recognized. As the thickness of the display device continues to be reduced, the distance or spacing for mixing the light emitted from the light-emitting devices in the backlight module is reduced as well. Accordingly, the backlight module may not provide the uniform light to the display module due to the insufficient spacing, and the performance of the display device therefore degrades.

SUMMARY OF THE DISCLOSURE

The present disclosure provides a display device including a backlight module and a display module. The backlight module includes a plurality of light emitting units, a base plate and at least one controller. The plurality of light emitting units are disposed on a first surface of the base plate, the at least one controller is disposed on a second surface of the base plate, the second surface is opposite to the first surface, and at least one of the plurality of light emitting units is electrically connected to the at least one controller. The display module is disposed on the first surface of the base plate, and the plurality of light emitting units are disposed between the display module and the base plate. The backlight module includes a covering layer, an optical film, and a plurality of pins, the covering layer is disposed on the first surface of the base plate, and the plurality of pins are disposed between the covering layer and the optical film.

The present disclosure provides a display device that includes a backlight module and a display module. The backlight module includes a plurality of light emitting units. The display module is disposed on the backlight module, wherein a spray angle of one of the light emitting units is greater than or equal to 135 degrees and less than 180 degrees.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the display device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ".

It will be understood that when an element or layer is referred to as being "on" or "connected to" another element or layer, it may be directly on or directly connected to the other element or layer, or intervening elements or layers may be presented (indirectly). In contrast, when an element is referred to as being "directly on" or "directly connected to" another element or layer, there are no intervening elements or layers presented.

It should be noted that the technical features in different embodiments described in the following may be replaced, recombined, or mixed with one another to constitute another embodiment without departing from the spirit of the present disclosure.

Figure 1:
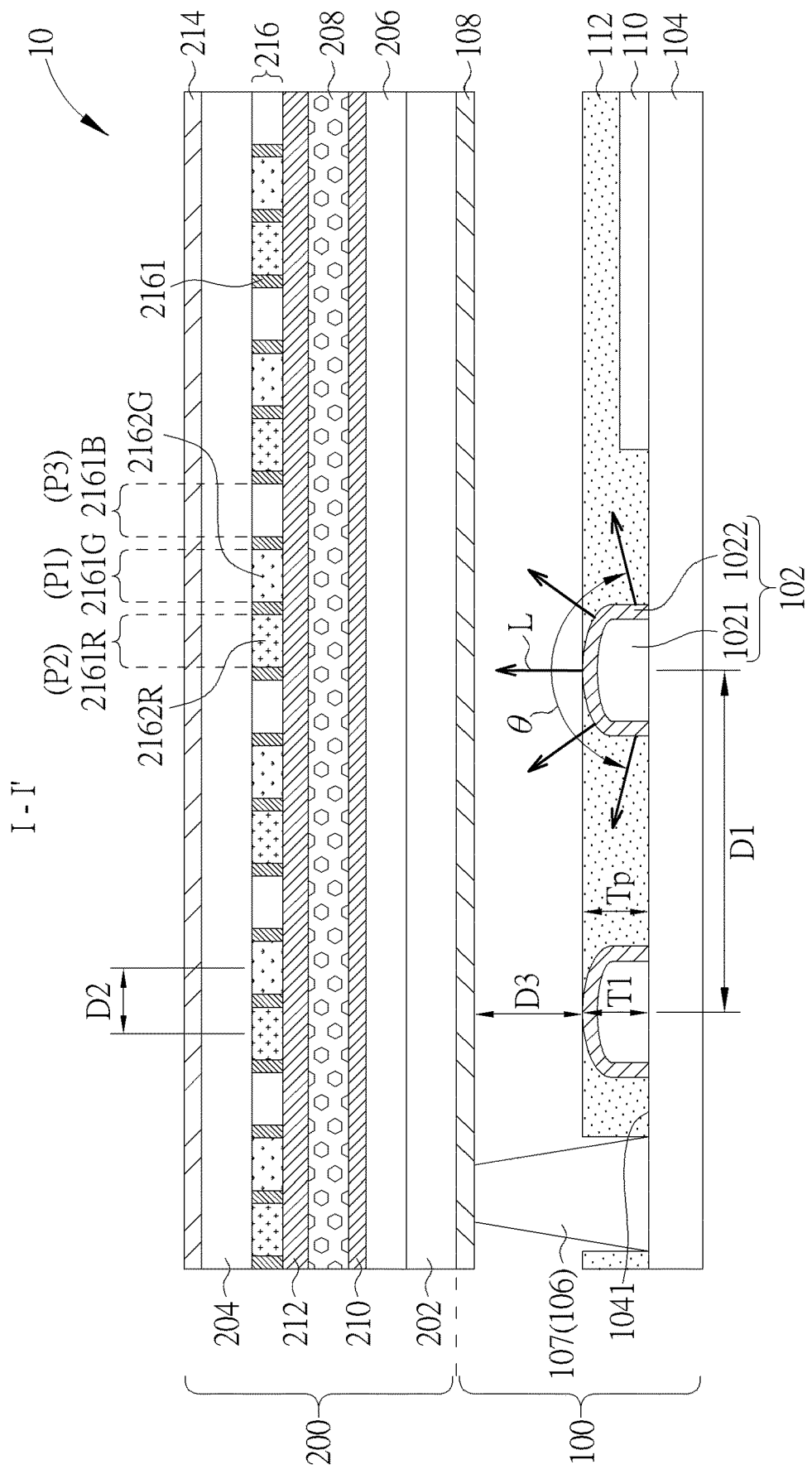
FIG. 1 is a cross-sectional schematic diagram of a display device according to a first embodiment of the present disclosure.
Figure 2:
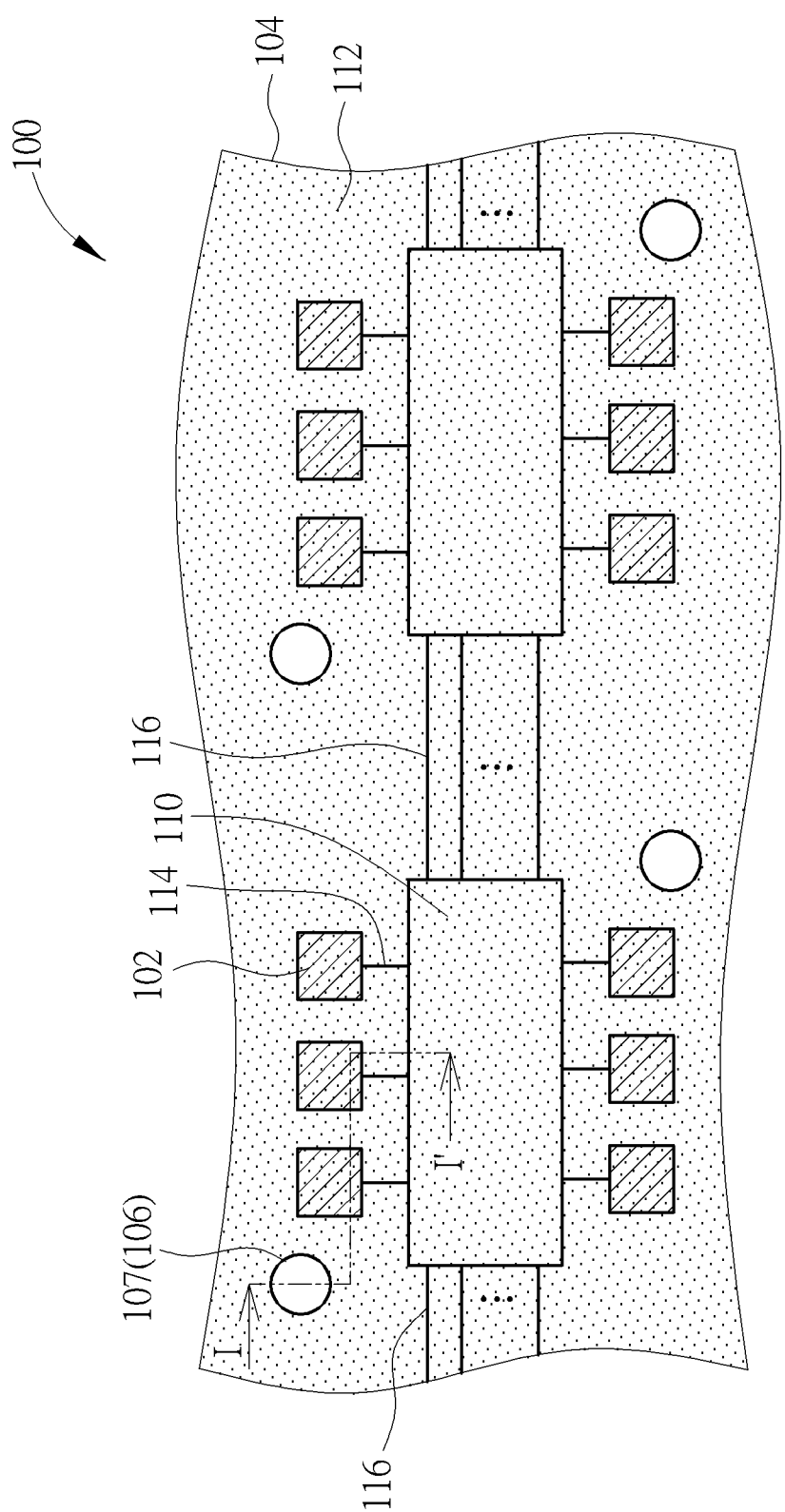
FIG. 2 is a schematic diagram illustrating a top view of a portion of a backlight module of the display device according to the first embodiment of the present disclosure.

Referring to FIG. 1 and FIG. 2, FIG. 1 is a cross-sectional schematic diagram of a display device according to a first embodiment of the present disclosure, FIG. 2 is a schematic diagram illustrating a top view of a portion of a backlight module of the display device according to the first embodiment of the present disclosure, wherein the cross-sectional structure shown in FIG. 1 corresponds to a line I-I' in FIG. 2. As shown in FIG. 1, a display device 10 includes a backlight module 100 and a display module 200 disposed on an emitting surface of the backlight module 100. The backlight module 100 can emit light passing through the display module 200, so that the display module 200 can display an image. The backlight module 100 includes a plurality of light emitting units 102 for generating light L. The light emitting units 102 are inorganic light emitting diodes or organic light emitting diodes. In each light emitting unit 102, luminance (Lx) of the light L is related to emission angle of the light L, emission angle is an included angle between an emission direction and a normal direction, and each light emitting unit 102 may have maximum Lx at a specific emission angle with respect to the normal direction of an emitting surface of the light emitting unit 102, for example, light with the maximum Lx (100% maximum Lx) may be emitted from a center of the emitting surface of the light emitting unit 102 along the normal direction, which means the specific emitting angle is 0 degree corresponding to the normal direction, but not limited thereto. In at least one of the light emitting units 102 of this disclosure, an angle between opposite sides of 30% maximum Lx is defined as a spray angle θ which is designed to be used as the light emitted from the backlight module 100, and the spray angle θ is greater than or equal to 135 degrees and less than 180 degrees. The spray angle is measured in a cross-section view of angle-to-luminance diagram which is a distribution of luminance corresponding to angle. From the origin point of cross-section of the angle-to-luminance diagram, in positive angle side we could find a specific angle corresponding to 30% maximum Lx, in negative angle side we could find another specific angle corresponding to 30% maximum Lx, and the difference (span) between the two specific angles is the spray angle. For example, the light emitting unit 102 with the above-mentioned light distribution may be a chip scale package (CSP) light emitting diode (LED) without relatively large size, the length or width of the chip scale package light emitting diode may be ranged from 0.1 mm to 10 mm, but not limited thereto.

As shown in FIG. 1 and FIG. 2, the backlight module 100 further includes a base plate 104, a supporting structure 106, a first optical film 108, a plurality of controllers 110, a protecting layer 112, and a plurality of conductive lines 114, 116. The light emitting units 102 are disposed on the base plate 104 and emit light L toward the display module 200, and the backlight module 100 of this embodiment may be for example a direct type backlight module. The light emitting units 102 may be mounted directly on the base plate 104, and the light emitting units 102 and the base plate 104 having such structure may also be regarded as having the so-called chip on board (COB) structure. The light emitting unit 102 may include a light emitting chip 1021 and an encapsulation layer 1022 covering the light emitting chip 1021. The light emitting chip 1021 in this embodiment can be a blue LED chip, but not limited thereto. In other embodiments, the light emitting chip 1021 may also be a red LED chip, a green LED chip, a white LED chip, an ultra violet (UV) LED chip, or other colors of LED chips. The encapsulation layer 1022 can include materials that can provide protection to the light emitting chip 1021, the materials may be selected from the group consisting of PI, PC, PE, acrylic, resin, polymer, $SiO_x$, $SiN_x$, and polymide, such materials may have electrical insulation or transparency, but not limited thereto.

In this embodiment, the base plate 104 may include the glass substrate with the conductive lines 114, 116 and the controllers 110 formed thereon, but not limited thereto. In other embodiments, the base plate 104 may be a printed circuit board (PCB) with plastic or resin based substrate. In this embodiment, the light emitting units 102, the controllers 110 and the conductive lines 114, 116 are disposed on a first surface 1041 of the base plate 104, wherein at least one of the light emitting units 102 is electrically connected to at least one of the controllers 110. For example, as shown in FIG. 2, each light emitting unit 102 is electrically connected to the controller 110 corresponding thereto by the corresponding conductive line 114, and the controllers 110 can be electrically connected to each other by the conductive lines 116. In other embodiment, there are more circuit components to electrically connect elements on the base plate 104 for driving. In this embodiment, the controllers 110 can be disposed in proximity to the light emitting units 102. For example, the controller 110 may be disposed adjoining to the light emitting units 102 or between two of the light emitting units 102, as shown in FIG. 1 and FIG. 2. Additionally, the configurations or numbers of the light emitting units 102 and the controllers 110 are not limited to the contents shown in FIG. 1 and FIG. 2. The conductive lines 114 and 116 may be formed of metal or metal oxide. Metal may include Ti, Pt, Au, Ni, Al, Mo, Cu, and the like, as well as alloys of such elements. Metal oxide may include indium tin oxide (ITO) or indium zinc oxide (IZO). The controllers 110 may include an application specific integrated circuit (ASIC) or the like that may be formed directly on the base plate 104 or mechanically mounted to the base plate 104.

In this embodiment, as shown in FIG. 1 and FIG. 2, the protecting layer 112 is disposed on the base plate 104. The protecting layer 112 covers at least two light emitting units 102 and at least one controller 110. A thickness of one of the light emitting units 102 is defined as a first thickness T1, and a thickness Tp of the protecting layer 112 is the same as the first thickness T1. The first thickness Ti is measured from the top of the light emitting unit 102 to the surface of the base plate 104 wherein the light emitting unit 102 is formed on. The thickness Tp of the protecting layer 112 is measured from the top of the protecting layer 112 to the surface of the base plate 104 wherein no other element is formed on. The protecting layer 112 may improve problems such as peeling or scratch issue of the light emitting units 102 or the controllers 110 by external forces, electric leakage, or electrostatic discharge (ESD) damage. Additionally, the coverage of the protecting layer 112 is adjustable. For example, the protecting layer 112 may cover most of the base plate 104, except the locations of the pins 107 of the supporting structure 106, but not limited thereto. In another embodiment, the protecting layer 112 may only cover regions of the base plate 104 that the light emitting units 102 and the controllers 110 are disposed thereon or regions of the base plate 104 that stress accumulates therein. In still another embodiment, the backlight module 100 may not include the protecting layer 112. The protecting layer 112 can include materials that can provide protection to the light emitting units 102 and the controllers 110, the materials may be selected from the group consisting of PI, PC, PE, acrylic, resin, polymer, $SiO_x$, $SiN_x$, and polymide, such materials may have electrical insulation, transparency, or may be adhesive, but not limited thereto.

The first optical film 108 is disposed on the light emitting units 102, and the supporting structure 106 is disposed between the base plate 104 and the first optical film 108. In this embodiment, the supporting structure 106 includes a plurality of pins 107 for supporting the first optical film 108 and uniforming the spacing between the first optical film 108 and the base plate 104. In this embodiment, two opposite ends of each pin 107 respectively contact the first optical film 108 and the base plate 104, but not limited thereto. Since the height of the pin 107 is greater than the first thickness T1 of the light emitting unit 102, a gap is formed between the first optical film 108 and the light emitting unit 102. A distance between the first optical film 108 and the light emitting unit 102 is defined as a third distance D3. The third distance D3 can be measured from the light emitting unit 102 to the first optical film 108 in a direction perpendicular to the surface of the first optical film 108. In addition, a ratio of the third distance D3 to the first thickness T1 (D3/T1) is ranged from 1.5 to 75. When the third distance D3 is too small (i.e., the ratio is less than 1.5), the mixing effect of the lights L generated from the light emitting units 102 may be poor, and the light provided by the backlight module 100 may have poor uniformity. When the third distance D3 is too large (i.e., the ratio is greater than 75), the ratio of brightness of the final output light of the backlight module 100 to brightness of light emitted from the light emitting units 102 may be too less, so the light exiting efficiency of the backlight module 100 is reduced.

The first optical film 108 may collimate the light L emitted from the light emitting units 102 and guide the light L to the display module 200. The first optical film 108 may be a multi-layer structure and may include for example a light guide, a diffusion sheet, a light enhancement sheet, prism sheets, a protection sheet, etc., but not limited thereto. In other embodiments, the first optical film 108 may be a single-layer structure.

The pins 107 may be formed of insulating materials (e.g., PI, PC, PE, acrylic, resin, or polymer), but not limited thereto. In addition, a cross-sectional profile of the pin 107 is a trapezoid, cylinder, or prism, but not limited thereto.

As shown in FIG. 1, the display module 200 includes a first substrate 202, a second substrate 204, an active matrix (AM) layer 206, a liquid crystal layer 208, a first polarizer 210, a second polarizer 212, and a second optical film 214. The first substrate 202 and the second substrate 204 are disposed opposite to each other, and the liquid crystal layer 208 is interposed between the first substrate 202 and the second substrate 204 to form a liquid crystal cell. The first substrate 202 and the second substrate 204 may include transparent substrates respectively, for example, each transparent substrate may be a rigid substrate such as a glass substrate or a quartz substrate, or a flexible substrate such as a plastic substrate, but not limited thereto. The plastic substrate may include material such as PI, PC, or PET. The active matrix layer 206 is disposed between the first substrate 202 and the liquid crystal layer 208. For example, plural thin film transistors (TFTs) and other circuit components may be disposed on a surface of the first substrate 202 for controlling the electric field applying to the liquid crystal layer 208.

In this embodiment, the first polarizer 210 is disposed between the liquid crystal layer 208 and the first substrate 202, the second polarizer 212 is disposed between the liquid crystal layer 208 and the second substrate 204, and the first polarizer 210 and the second polarizer 212 may be so-called inner polarizers because they are positioned inside a liquid crystal cell. In conventional, polarizers are attached on outside surfaces of liquid crystal cell. The first polarizer 210 and the second polarizer 212 in this embodiment may be wire grid polarizers (WGP), but not limited thereto.

In addition, a light converting layer 216 includes a plurality of quantum dots (QD) and a blocking portion 2161. The blocking portion 2161 includes a plurality of apertures 2161R, a plurality of apertures 2161G, and a plurality of apertures 2161B, wherein each aperture can correspond to an area of a pixel (sub-pixel). The blocking portion 2161 may include any material that can block light, such as metal material, black inorganic material, black organic materials or photoresist materials. For example, the material generally used for forming the black matrix may be adopted to form the blocking portion 2161. The quantum dots in this embodiment include a plurality of first quantum dot portions 2162G and a plurality of second quantum dot portions 2162R. Each of the first quantum dot portions 2162G is disposed in an aperture 2161G (a first pixel P1). The quantum dot material (s) or particles in the first quantum dot portions 2162G are capable of converting the light L (i.e. blue light in this embodiment, UV light in other embodiments) emitted from the light emitting units 102 into green light, and therefore the first pixels P1 are green pixels. Similarly, each of the second quantum dot portions 2162R is disposed in an aperture 2161R (a second pixel P2), the quantum dot material(s) or particles in the second quantum dot portions 2162R are capable of converting the light L emitted from the light emitting units 102 into red light, and therefore the second pixels P2 are red pixels. In this embodiment, the apertures 2161B correspond to a plurality of third pixels P3, wherein the third pixels P3 are blue pixels. Since the light emitting units 102 emits blue light, it is not necessary to additionally dispose blue quantum dot material(s) or particles in the aperture 2161B, and the blue light can emit through the apertures 2161B directly, but not limited thereto. In addition, the pixel mentioned herein may be a sub-pixel or a pixel of an image displayed from the display module. Colors of the pixels of this disclosure are not limited to the description above.

In this embodiment, a distance (from center to center, or from edge to edge, a repeatable range) between adjacent two of the light emitting units 102 is defined as a first distance D1, and a distance (from center to center, or from edge to edge, a repeatable range) between adjacent two of the pixels is defined as a second distance D2, wherein a ratio of the first distance D1 to the second distance D2 (D1/D2) is ranged from 3 to 1000, and such ratio is defined as LED distance per pixel distance (LDPPD) in this disclosure. The first distance D1 may be calculated from a location in a light emitting unit 102 to the same location in another light emitting unit 102 adjacent thereto, and the second distance D2 may be calculated from a location in a pixel (e.g., a first pixel P1, a second pixel P2, or a third pixel P3) to the same location in another pixel adjacent thereto. For example, the first distance D1 may be calculated from a center of a light emitting unit 102 to a center of another light emitting unit 102 adjacent thereto, and the second distance D2 may be calculated from a center of a pixel (e.g., a first pixel P1, a second pixel P2, or a third pixel P3) to a center of another pixel adjacent thereto, but not limited thereto.

In addition, the widths of the first pixel P1, the second pixel P2, and the third pixel P3 may be different, and therefore the distances between adjacent two of the pixels in a group including the first pixels P1, the second pixels P2, and the third pixels P3 may also be different. In this situation, the second distance D2 is defined by the shortest distance between adjacent two of the pixels in the above group of pixels.

The LDPPD is a reference for designs such as local dimming or high dynamic range (HDR) of the display device 10. For example, the light emitting unit 102 in this embodiment is CSP LED, its size is less than the conventional LED, so the number of CSP LEDs that can be disposed in a certain area of the base plate 104 may be more comparing to the display device using conventional LEDs in the same condition, and the smaller first distance D1 may be obtained in this embodiment. Therefore, the LDPPD of the display device 10 in this embodiment may be less than that of the display device having conventional LEDs. For example, the LDPPD in this embodiment is ranged from 3 to 200, but not limited thereto. The display device 10 may thus achieve better control of local dimming and have ability to adjust the brightness of a smaller region of pixels.

The shape of each light emitting unit 102 may include shapes such as square, rectangle, pentagon, trapezoid, hexagon, circle, ellipse, rhombus, octagon, etc. In one embodiment, light emitting units 102 may be divided into different groups which may be disposed on different regions of the base plate 104. The light emitting units 102 in each group may be disposed in the matrix arrangement or in the brick arrangement. For example, the light emitting units 102 in some groups may be disposed in the matrix arrangement and the light emitting units 102 in other groups may be disposed in the brick arrangement. In another embodiment, different groups may have different power consumptions. For example, the power consumption of some of the groups may be 2 watts, the power consumption of the other groups may be 1 watt, and the brightness of the light emitting area may be different when the power consumptions are different.

The second optical film 214 is disposed on the second substrate 204 to reduce the amount of ambient light penetrating into the display device 10 and prevent the ambient light from reacting with the QD in the light converting layer 216. The second optical film 214 may include the multi-layer structure, in which several layers having high refractive index or low refractive index may stack together, but not limited thereto. In another embodiment, the second optical film 214 may include a semi-transmittance structure, in which at least one reflection layer, at least one inorganic layer, and at least one metal layer may stack together, and the stacked layers may have openings, but not limited thereto. In other embodiment, the second optical film 214 may be quarter wavelength plate.

The following description will detail the different embodiments of the present disclosure. To simplify the description, identical components in each of the following embodiments are marked with identical symbols. For making it easier to understand the differences between the embodiments, the following description will detail the dissimilarities among different embodiments and the identical features will not be redundantly described.

Figure 3:
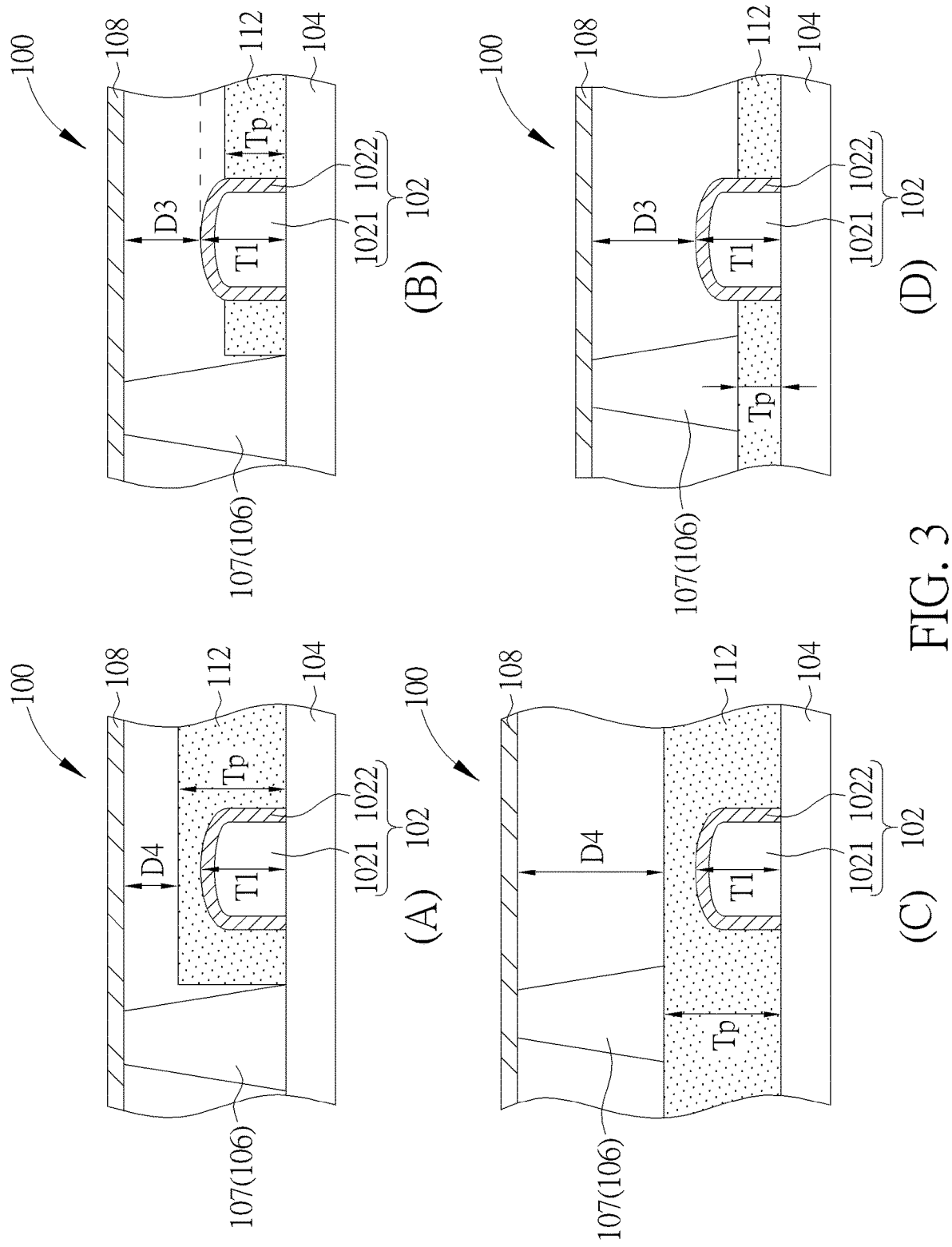
FIG. 3 is a schematic diagram illustrating various backlight modules according to various examples of a second embodiment of the present disclosure.

Referring to FIG. 3, FIG. 3 is a schematic diagram illustrating various backlight modules according to various examples of a second embodiment of the present disclosure. As shown in the part (A) of FIG. 3, the difference between the backlight module 100 in the part (A) of this embodiment and the first embodiment is that the thickness Tp of the protecting layer 112 is greater than the first thickness T1 of the light emitting unit 102 in the part (A) of this embodiment. In addition, a distance between the first optical film 108 and the protecting layer 112 is defined as a fourth distance D4. The fourth distance D4 can be measured from a top surface of the protecting layer 112 to the bottom surface of the first optical film 108 in a direction perpendicular to the bottom surface of the first optical film 108 or the top surface of the protecting layer 112. In addition, a ratio of the fourth distance D4 to the first thickness T1 (D4/T1) is ranged from 1.5 to 75. As shown in the part (B) of FIG. 3, the difference between the backlight module 100 in the part (B) of this embodiment and the first embodiment is that the thickness Tp of the protecting layer 112 is less than the first thickness T1 of the light emitting unit 102 in the part (B) of this embodiment. As shown in the part (C) and the part (D) of FIG. 3, the difference between the backlight module 100 in the part (C) and the part (A) and the difference between the backlight module 100 in the part (D) and the part (B) in this embodiment are that the supporting structure 106 is disposed on the protecting layer 112 and between the protecting layer 112 and the first optical film 108. Additionally, two opposite ends of each pin 107 respectively contact the first optical film 108 and the protecting layer 112, but not limited thereto.

Figure 4:
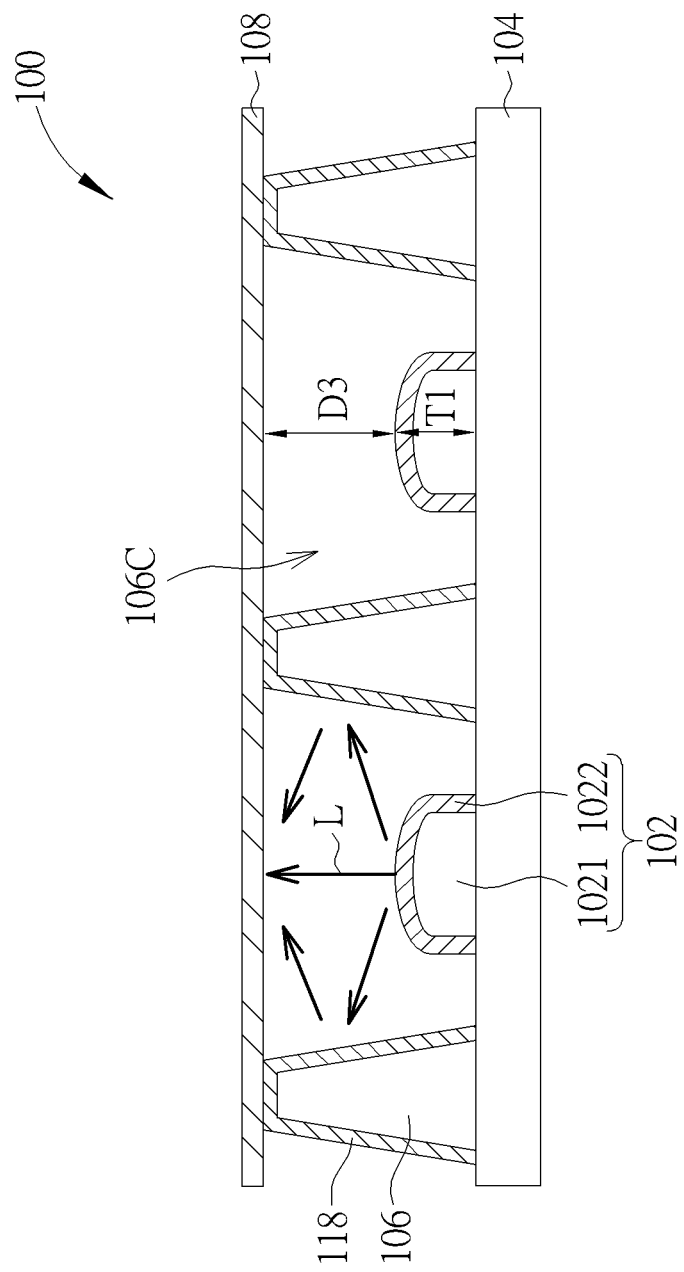
FIG. 4 is a cross-sectional schematic diagram of a backlight module according to a third embodiment of the present disclosure.

Referring to FIG. 4, FIG. 4 is a cross-sectional schematic diagram of a backlight module according to a third embodiment of the present disclosure. As shown in FIG. 4, the difference between this embodiment and the first embodiment is that the supporting structure 106 includes a plurality of cavities 106C, and each of the light emitting units 102 is disposed in one of the cavities 106C. The supporting structure 106 may be formed of insulating materials (e.g., resin), but not limited thereto. A reflective layer 118 is disposed on side surfaces and top surface of the supporting structure 106, but not limited thereto. The reflective layer 118 may be formed of reflective materials (e.g., metal or multi-layer reflective structure), but not limited thereto. The light L emitted from the light emitting unit 102 can be reflected in the cavity 106C by the reflective layer 118, so that the loss of the light L can be reduced and the light efficiency of the backlight module 100 can be improved. In addition, the backlight module 100 in this embodiment may not include the protecting layer 112 in the first embodiment, but not limited thereto. In another embodiment, the protecting layer can be filled in each of the cavities and cover the light emitting units. In still another embodiment, the supporting structure and the protecting layer can together form a flat top surface, and an adhesive layer can be disposed between the flat top surface and the first optical film 108, such that the backlight module and the display module can be bonded by the adhesive layer. The adhesive layer may include optically clear adhesive (OCA), but not limited thereto.

Figure 5:
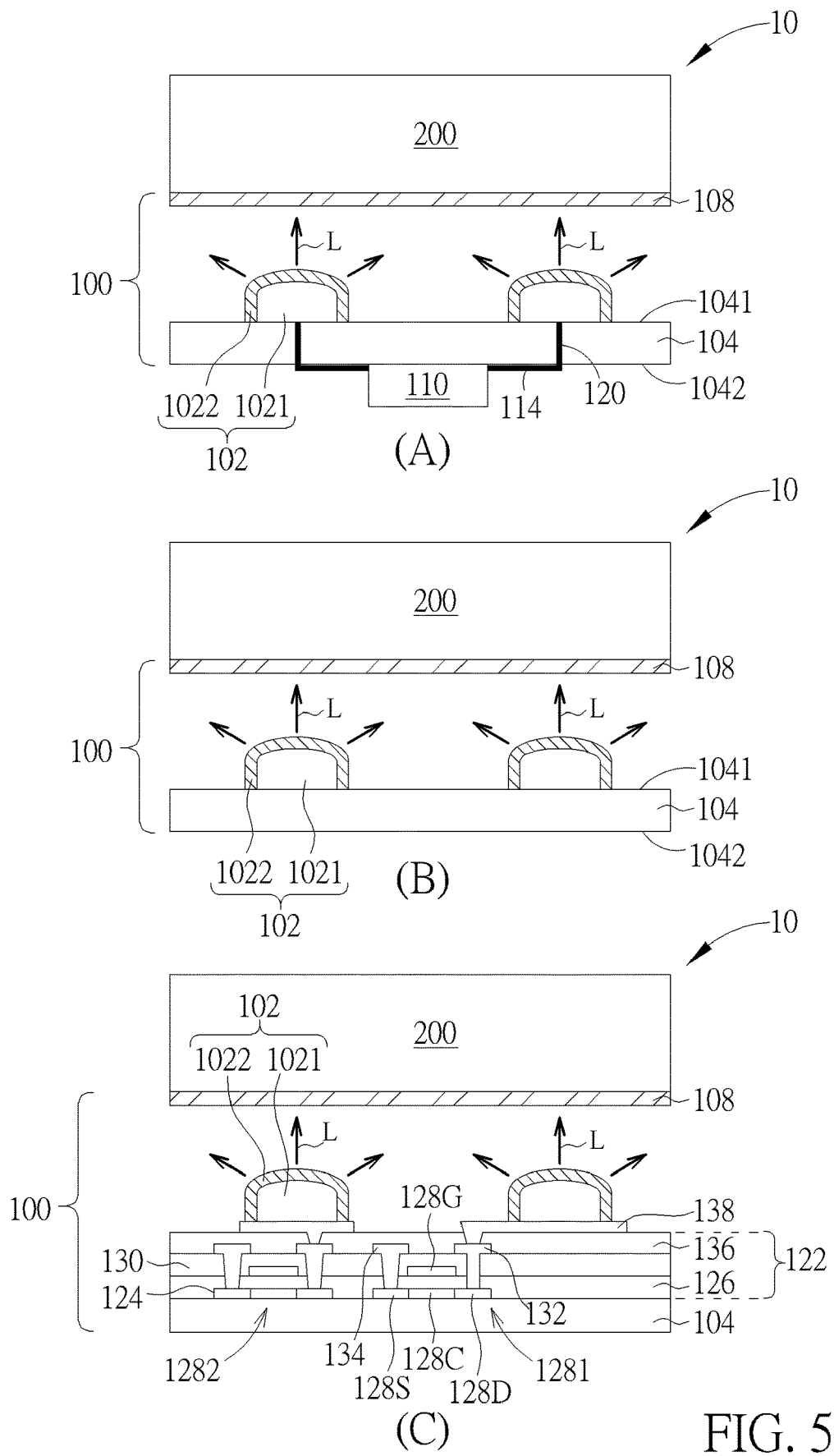
FIG. 5 is a schematic diagram illustrating various display devices according to various examples of a fourth embodiment of the present disclosure.

Referring to FIG. 5, FIG. 5 is a schematic diagram illustrating various display devices according to various examples of a fourth embodiment of the present disclosure. As shown in the part (A) of FIG. 5, the difference between the backlight module 100 in the part (A) of this embodiment and the first embodiment is that the light emitting units 102 and the controllers 110 are disposed on opposite surfaces of the base plate 104. For example, the light emitting units 102 are disposed on the first surface 1041 of the base plate 104, and the controllers 110 are disposed on a second surface 1042 of the base plate 104 opposite to the first surface 1041. In addition, at least one light emitting unit 102 is electrically connected to at least one controller 110. For example, as shown in the part (A) of FIG. 5, two light emitting units 102 are respectively electrically connected to one controller 110 by two conductive lines 114 through two via holes 120 penetrating through the base plate 104. Additionally, in this embodiment, the base plate 104 may be the glass substrate, and through glass vias (TGVs) or through plastic vias (TPVs) may be applied to the base plate 104 to electrically connect the light emitting units 102 and the controller 110, but not limited thereto.

As shown in the part (B) of FIG. 5, at least one light bar is applied to the backlight module 100. For example, the light emitting units 102 may be mounted on the base plate 104 and disposed in a strip arrangement to form the light bar. The base plate 104 may be for example PCB that can electrically connect the light emitting units 102 disposed thereon to one or more driving devices.

As shown in the part (C) of FIG. 5, the backlight module 100 further includes an active matrix layer 122 disposed between the light emitting units 102 and the base plate 104. The active matrix layer 122 includes a semiconductor layer 124, a dielectric layer 126, a conductive layer having gate electrodes 128G, a dielectric layer 130, a conductive layer having drain electrodes 132 and source electrodes 134, and an optional dielectric layer 136, so as to form a plurality of TFTs 1281, 1282 disposed between the light emitting units 102 and the base plate 104. The TFTs 1281, 1282 serve as switch elements for driving the light emitting units 102 in the backlight module 100. The semiconductor layer 124 is formed of a semiconductor material, such as silicon or metal oxide, but not limited thereto. For example, the semiconductor layer 124 may be amorphous silicon, low temperature poly-silicon, or indium gallium zinc oxide (IGZO). The semiconductor layer 124 includes a source contact 128S, a drain contact 128D, and a channel 128C disposed between the source contact 128S and the drain contact 128D in one TFT. Each source electrode 134 is electrically connected to the corresponding source contact 128S through a via hole in the dielectric layer 130 and the dielectric layer 126. Each drain electrode 132 is electrically connected to the corresponding drain contact 128D through another via hole in the dielectric layer 130 and the dielectric layer 126. The gate electrode 128G is separated from the channel 128C by the dielectric layer 126 (e.g., a gate dielectric layer). The gate electrode 128G, the source electrode 134 and the drain electrode 132 may be formed of conductive materials (such as metal), but not limited thereto. It should be noted that the structure of the TFTs shown in the part (C) of FIG. 5 is merely an example and is not meant to limit the types or structures of the TFTs of the present disclosure, and any other suitable TFT structures may replace the illustrated TFTs. For example, the TFTs 1281, 1282 are top-gate type TFTs in this embodiment; however, bottom-gate type TFTs may be used as the TFTs 1281, 1282 in other embodiments.

In addition, at least one of the light emitting units 102 is electrically connected to at least one of the TFTs 1281, 1282. For example, the TFTs 1281, 1282 are respectively electrically connected to the corresponding light emitting units 102 through connecting electrodes 138. The connecting electrodes 138 may be formed of conductive materials (such as metal), but not limited thereto. In the part (C) of FIG. 5, each of the light emitting units 102 is electrically to one of the TFTs (TFT 1281 or TFT 1282), but not limited thereto. In other embodiments, each of the light emitting units 102 may be electrically to plural TFTs, or plural light emitting units 102 may be electrically connected to one TFT. In addition, in the part (C) of FIG. 5, the TFT 1282 is at least partially covered or overlapped by the corresponding light emitting unit 102 disposed thereon, and the TFT 1281 is not covered or overlapped by the corresponding light emitting unit 102 disposed thereon, but not limited thereto. In this situation, the backlight module 100 may further include the supporting structures 106 described in the above embodiments, wherein the supporting structure 106 may be disposed on the active matrix layer 122 and cover the TFT 1281. In addition, the backlight modules 100 in FIG. 5 may further include the protecting layers 112 described in the above embodiments, so as to cover the light emitting units 102.

Figure 6:
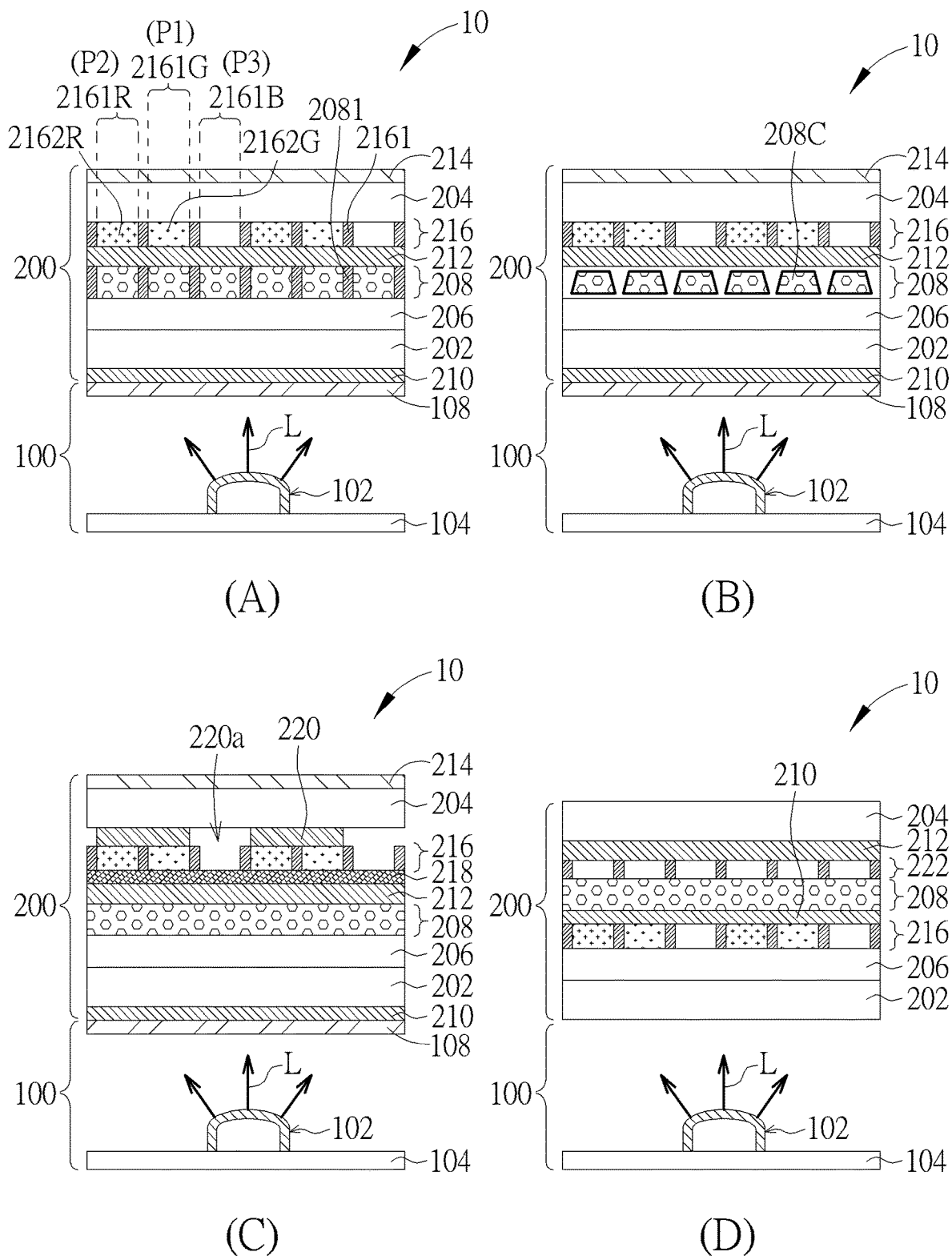
FIG. 6 is a schematic diagram illustrating various display devices according to various examples of a fifth embodiment of the present disclosure.

Referring to FIG. 6, FIG. 6 is a schematic diagram illustrating various display devices according to various examples of a fifth embodiment of the present disclosure. For clarity, the supporting structure 106, the controller 110 and the protecting layer 112 of the backlight module 100 are not shown, but not limited thereto. The backlight module 100 may be any one of the backlight modules described in the above embodiments. In the display modules 200 of this embodiment shown in FIG. 6, one of the polarizers 210, 212 is disposed between the first light converting layer 216 and the liquid crystal layer 208. As shown in the part (A) of FIG. 6, one difference between the part (A) of FIG. 6 and the first embodiment is that the first polarizer 210 is disposed between the first substrate 202 and the first optical film 108 in the part (A) of FIG. 6. The first polarizer 210 in the part (A) of FIG. 6 may be so-called outer polarizer (conventional), wherein the first polarizer 210 may be formed of plastic materials, but not limited thereto. Another difference between the part (A) of FIG. 6 and the first embodiment is that the liquid crystal layer 208 further includes partitions 2081 to isolate different portions of the liquid crystal molecules. The partitions 2081 can be disposed corresponding to the blocking portion 2161, and each portion of the liquid crystal molecules can correspond to one of the pixels, but not limited thereto. The partitions 2081 may be formed of the material generally used for forming the black matrix, but not limited thereto. For example, the partitions 2081 may be formed of resin including carbon or titanium pigment.

As shown in the part (B) of FIG. 6, the difference between the part (B) and the part (A) of FIG. 6 is that the liquid crystal layer 208 includes micro cavity structure in the part (B). In the micro cavity structure, a plurality of tunnel-shaped cavities 208C are disposed in an organic or inorganic insulation layer, wherein liquid crystal capsules may respectively be disposed in each of the tunnel-shaped cavities 208C, and each liquid crystal capsule may include liquid crystal molecules surrounded by an insulation layer. An alignment layer may also be formed in each tunnel-shaped cavity 208C, but not limited thereto.

As shown in the part (C) of FIG. 6, the difference between the part (C) and the part (A) of FIG. 6 is that the liquid crystal layer 208 does not includes partitions, and the display module 200 includes a first Bragg layer 218 and a second Bragg layer 220 in the part (C). Bragg layer is one kind of transflective layer with half transparent ability and half reflective ability. The first Bragg layer 218 is disposed between the second polarizer 212 and the light converting layer 216, and the second Bragg layer 220 is disposed between the light converting layer 216 and the second substrate 204. Both of the first Bragg layer 218 and the second Bragg layer 220 are formed of layers stacked together, wherein numbers of layers stacked in the first Bragg layer 218 and the second Bragg layer 220 are different, and the thickness of the first Bragg layer 218 and the second Bragg layer 220 are different, but not limited thereto. The first Bragg layer 218 can be a full layer that can cover the light converting layer 216 entirely, but not limited thereto. The first Bragg layer 218 can prevent the light converted by the quantum dot materials (i.e., green or red light in this embodiment) from being reflected back to the liquid crystal layer 208, or being reflected to the adjacent pixels and affecting colors of the adjacent pixels. The second Bragg layer 220 includes a plurality of apertures 220a, wherein the apertures 220a may be disposed corresponding to the apertures 2161B (i.e., the third pixels P3) for allowing the blue light passing through. The apertures 220a may be filled with a filling layer or a plurality of scattering particles. The second Bragg layer 220 covers the first quantum dot portions 2162G and the second quantum dot portions 2162R (i.e., the first pixels P1 and the second pixels P2), and the second Bragg layer 220 can block the residual blue light that is not converted by quantum dot materials in the first quantum dot portions 2162G or the second quantum dot portions 2162R to maintain colors of the first pixels P1 and the second pixels P2.

As shown in the part (D) of FIG. 6, one of the differences between the part (D) of FIG. 6 and the first embodiment is that the light converting layer 216 is disposed between the active matrix layer 206 and the first polarizer 210 in the part (D) of FIG. 6, and the structure of the light converting layer 216, the active matrix layer 206 and the first substrate 202 can be so-called color filter on array (COA) structure. The display module 200 in the part (D) of FIG. 6 further includes a black matrix 222 disposed between the second polarizer 212 and the liquid crystal layer 208, so as to prevent the color of each pixel from being affected by light corresponding to other pixels. In addition, the display device 10 in the part (D) of FIG. 6 does not include the first optical film 108 and the second optical film 214 in the first embodiment. In the display device 10 in the part (D), the first substrate 202 can be glass substrate that can serve as glass light guide plate (GLGP), so as to guide the light L emitted from the light emitting units 102 to the display module 200. The second polarizer 212 and the black matrix 222 together can reflect or absorb the ambient light, so as to reduce the amount of ambient light penetrating into the display device 10 and reacting with the QD in the light converting layer 216.

Figure 7:
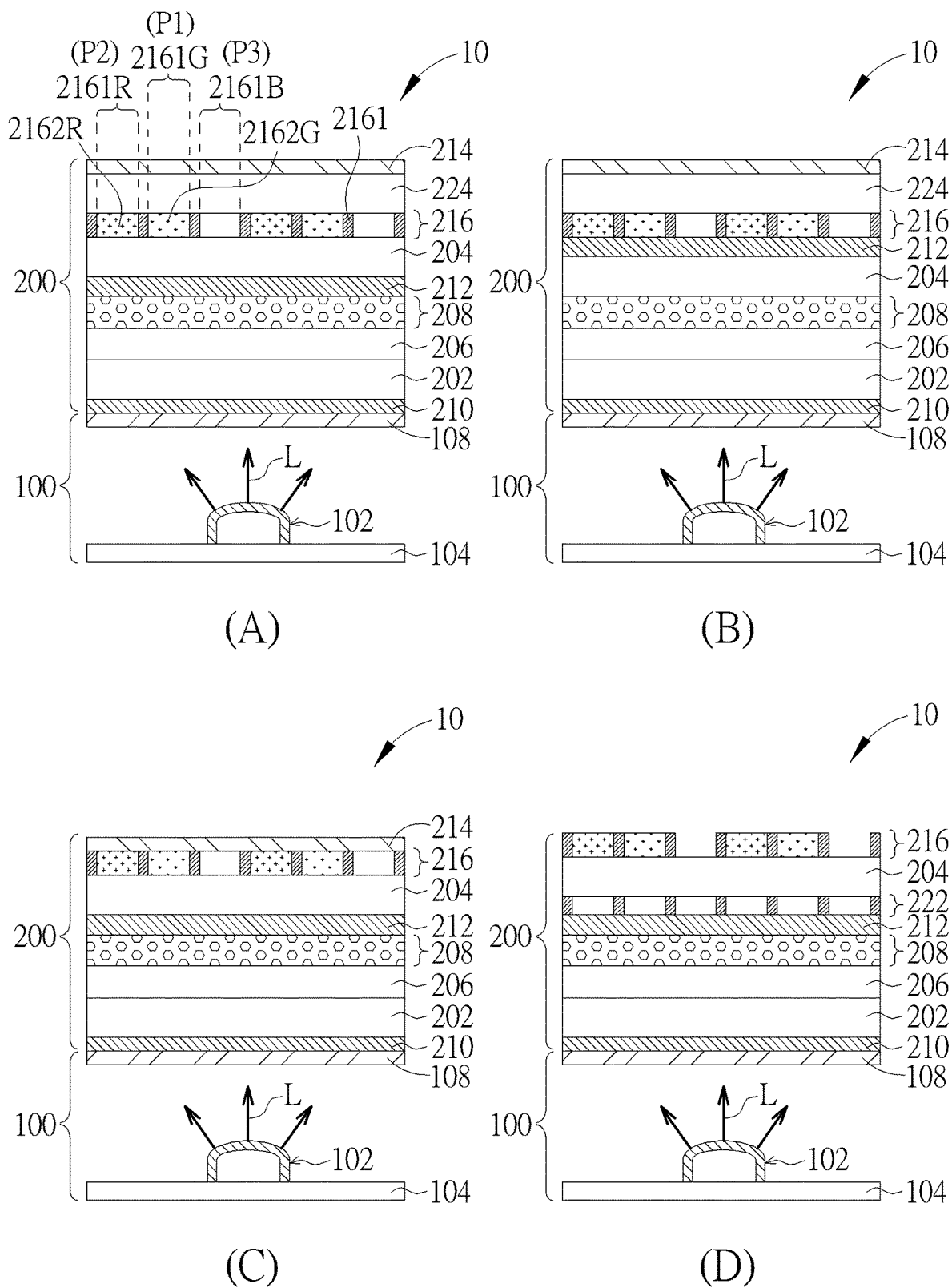
FIG. 7 is a schematic diagram illustrating various display devices according to various examples of a sixth embodiment of the present disclosure.

Referring to FIG. 7, FIG. 7 is a schematic diagram illustrating various display devices according to various examples of a sixth embodiment of the present disclosure. For clarity, the supporting structure 106, the controller 110 and the protecting layer 112 of the backlight module 100 are not shown, but not limited thereto. The backlight module 100 may be any one of the backlight modules described in the above embodiments. In the display modules 200 of this embodiment shown in FIG. 7, one of the polarizers 210, 212 is disposed between the first light converting layer 216 and the liquid crystal layer 208. As shown in the part (A) of FIG. 7, the difference between the part (A) of FIG. 7 and the part (A) of FIG. 6 is that the display module 200 in the part (A) of FIG. 7 further includes a third substrate 224, wherein the second substrate 204 is disposed between the first substrate 202 and the third substrate 224, the light converting layer 216 is disposed between the second substrate 204 and the third substrate 224, and the second optical film 214 is disposed on the third substrate 224. The third substrate 224 may be formed of materials that are the same as the second substrate 204 or the first substrate 202, but not limited thereto. In addition, another difference is that the liquid crystal layer 208 in the display module 100 in the part (A) of FIG. 7 does not include partitions, but not limited thereto.

As shown in the part (B) of FIG. 7, the difference between the part (B) and the part (A) of FIG. 7 is that the second polarizer 212 is disposed between the first substrate 202 and the light converting layer 216 in the part (B). The second polarizer 212 in the part (B) of FIG. 7 may be so-called outer polarizer (conventional), wherein the second polarizer 212 may be formed of plastic materials for instance, but not limited thereto. As shown in the part (C) of FIG. 7, the difference between the part (C) and the part (A) of FIG. 7 is that the display module 100 in the part (C) does not include the third substrate disposed between the second optical film 214 and the light converting layer 216. As shown in the part (D) of FIG. 7, the difference between the part (D) and the part (C) of FIG. 7 is that the display module 200 in the part (D) does not include the second optical film and further include a black matrix 222 disposed between the second substrate 204 and the second polarizer 212.

Figure 8:
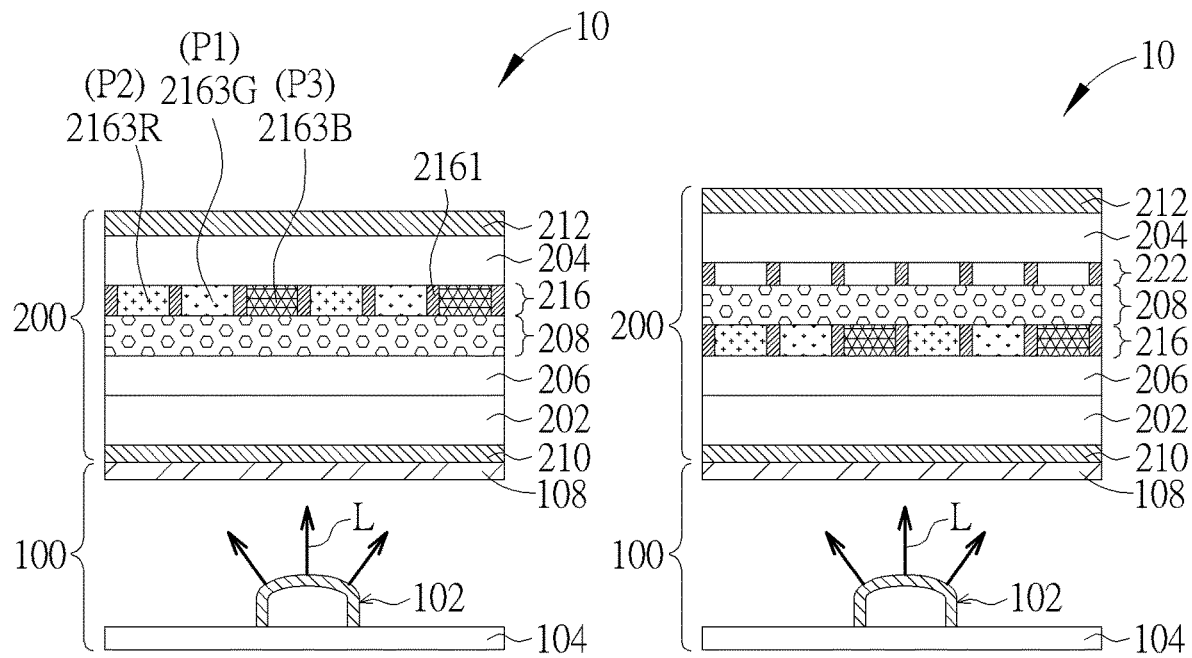
FIG. 8 is a schematic diagram illustrating various display devices according to various examples of a seventh embodiment of the present disclosure.
Figure 8:
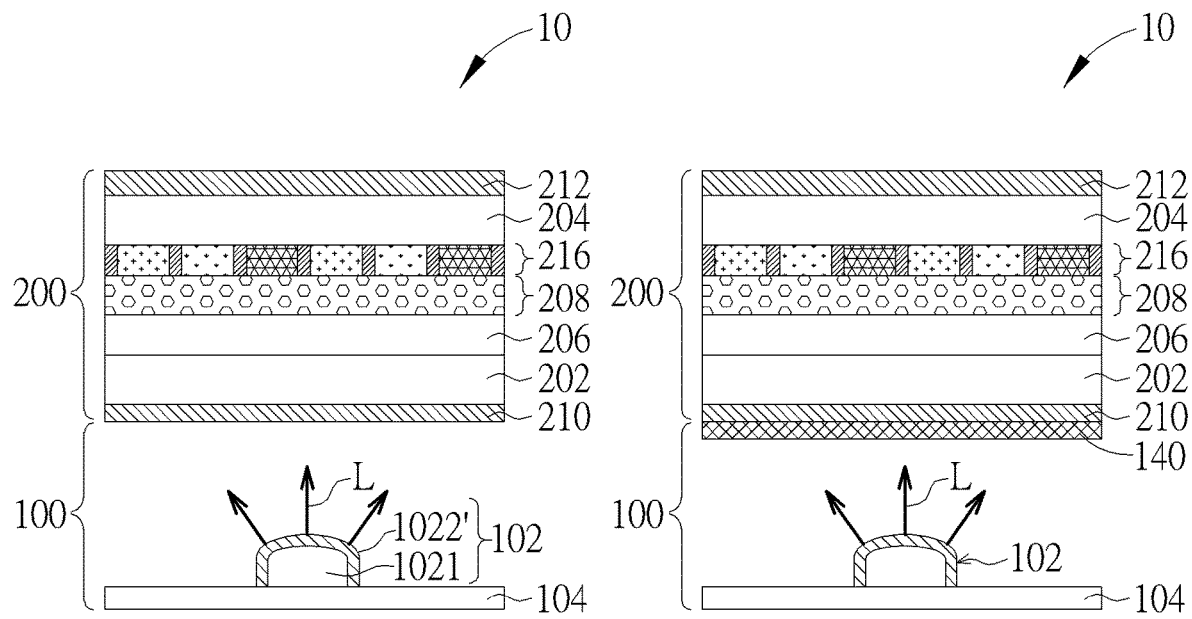

Referring to FIG. 8, FIG. 8 is a schematic diagram illustrating various display devices according to various examples of a seventh embodiment of the present disclosure. For clarity, the supporting structure 106, the controller 110 and the protecting layer 112 of the backlight module 100 are not shown, but not limited thereto. The backlight module 100 may be any one of the backlight modules described in the above embodiments. In the display modules 200 of this embodiment shown in FIG. 8, the light converting layer 216 is disposed between one of the polarizers 210, 212 and the liquid crystal layer 208. As shown in the part (A) of FIG. 8, one difference between the part (A) of FIG. 8 and the first embodiment is that the light L emitted by the light emitting units 102 is white light, and the light converting layer 216 is color filter in the part (A) of FIG. 8. The light converting layer 216 may include a plurality of first portions 2163R for converting white light into red light, a plurality of second portions 2163G for converting white light into green light, and a plurality of third portions 2163B for converting white light into blue light, but not limited thereto. The second portions 2163G may correspond to the first pixels P1, the first portions 2163R may correspond to the second pixels P2, and the third portions 2163B may correspond to the third pixels P3. Another difference between the part (A) of FIG. 8 and the first embodiment is that the second polarizer 212 is disposed on the second substrate 204, and the first polarizer 210 is disposed under the first substrate 202 in the part (A) of FIG. 8. The second substrate 204 is disposed between the second polarizer 212 and the light converting layer 216, the first substrate 202 is disposed between the active matrix layer 206 and the first polarizer 210, the first polarizer 210 and the second polarizer 212 may be so-called outer polarizers, and the first polarizer 210 and the second polarizer 212 may be formed of plastic materials, but not limited thereto. In addition, the display module 200 in the part (A) of FIG. 8 does not include the second optical film.

As shown in the part (B) of FIG. 8, one of the differences between the part (B) and the part (A) of FIG. 8 is that the light converting layer 216 is disposed between the active matrix layer 206 and the liquid crystal layer 208 in the part (B), and the structure of the light converting layer 216, the active matrix layer 206 and the first substrate 202 can be so-called color filter on array (COA) structure. The display module 200 in the part (B) further includes the black matrix 222 disposed between the second substrate 204 and the liquid crystal layer 208, so as to prevent the color of each pixel from being affected by light corresponding to other pixels.

As shown in the part (C) of FIG. 8, one of the differences between the part (C) and the part (A) of FIG. 8 is that each of the light emitting units 102 further includes another light converting layer 1022' respectively in the part (C). The light converting layer 1022' can serve as an encapsulation layer of each light emitting unit 102, but not limited thereto. The light converting layer 1022' includes a plurality of quantum dots. For example, blue light emitted by the light emitting chips 1021 can be converted into white light by the light converting layer 1022', and therefore the light L emitted by the light emitting units 102 is white light, but not limited thereto. In addition, the backlight module 100 in the part (C) does not include the first optical film, but not limited thereto.

As shown in the part (D) of FIG. 8, the difference between the part (D) and the part (C) of FIG. 8 is that the backlight module 100 in the part (D) further includes another light converting layer 140. The light converting layer 140 in the part (D) is a full layer disposed on the light emitting units 102 and covers the light emitting units 102. In addition, the light L emitted by the light emitting units 102 is blue light, and the light L can be convert into white light after passing through the light converting layer 140.

Figure 9:
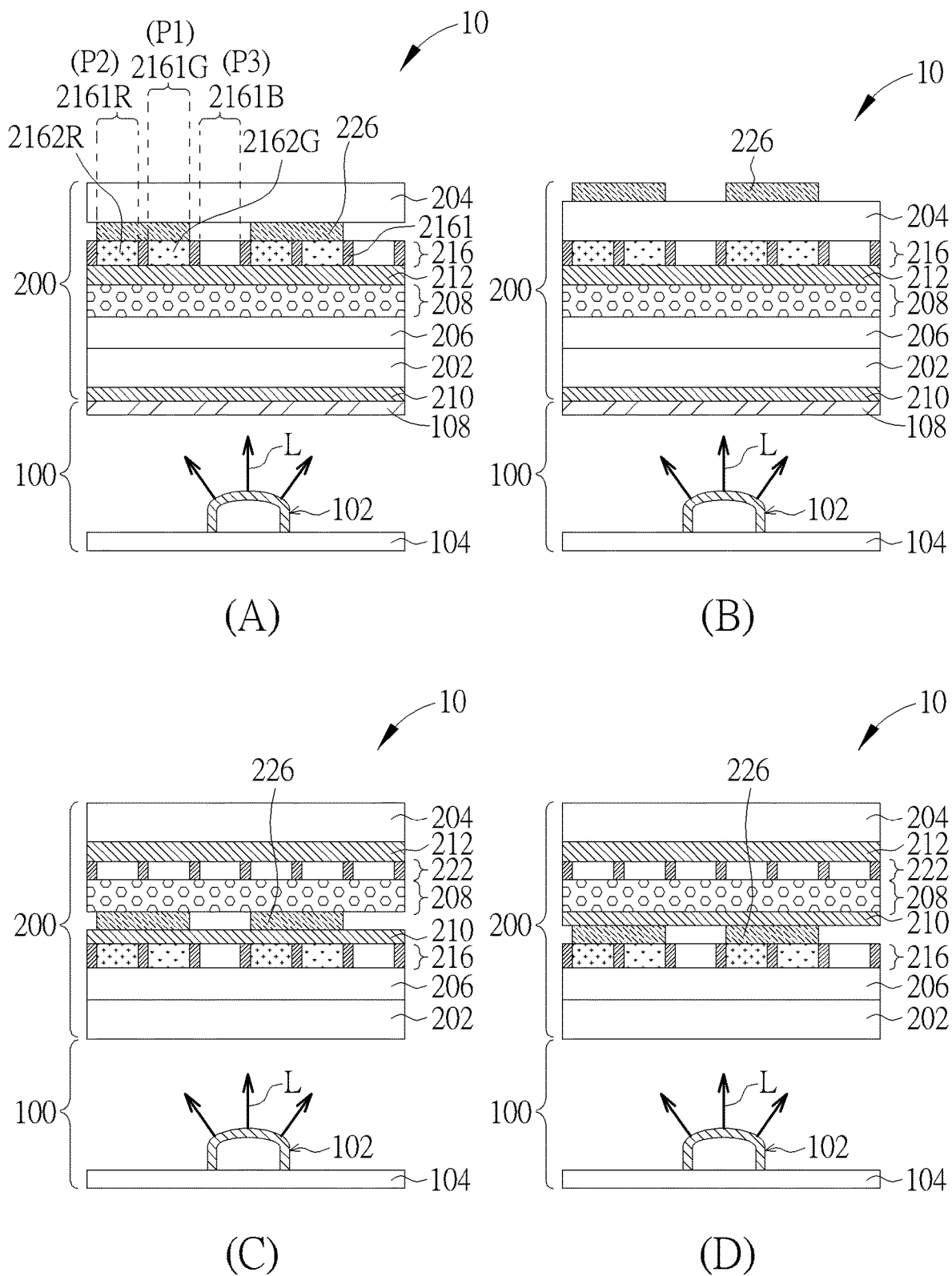
FIG. 9 is a schematic diagram illustrating various display devices according to various examples of an eighth embodiment of the present disclosure.

Referring to FIG. 9, FIG. 9 is a schematic diagram illustrating various display devices according to various examples of an eighth embodiment of the present disclosure. For clarity, the supporting structure 106, the controller 110 and the protecting layer 112 of the backlight module 100 are not shown, but not limited thereto. The backlight module 100 may be any one of the backlight modules described in the above embodiments. In the display modules 200 of this embodiment shown in FIG. 9, the display device 10 further includes a transflective layer 226, wherein the light converting layer 216 is disposed between the transflective layer 226 and the light emitting units 102. The transflective layer 226 may be a Bragg layer, or a half transparent metal film. As shown in the part (A) of FIG. 9, one difference between the part (A) of FIG. 9 and the part (A) of FIG. 6 is that the display module 200 in the part (A) of FIG. 9 further includes the transflective layer 226 disposed between the second substrate 204 and the light converting layer 216. The transflective layer 226 covers the first pixels P1 and the second pixels P2 and does not cover the third pixels P3. The transflective layer 226 can absorb the residual blue light that is not converted by the first quantum dot portion 2162G or the second quantum dot portion 2162R of the light converting layer 216 and allow light generated from the first quantum dot portion 2162G and the second quantum dot portion 2162R passing through, so as to maintain colors of the first pixels P1 and the second pixels P2. The transflective layer 226 is formed of titanium dioxide (TiO$_2$), but not limited thereto. In addition, the display module 200 in the part (A) of FIG. 9 does not include the second optical film, and the liquid crystal layer 208 does not include partitions, but not limited thereto.

As shown in the part (B) of FIG. 9, the difference between the part (B) and the part (A) of FIG. 9 is that the second substrate 204 is disposed between the transflective layer 226 and the light converting layer 216. As shown in the part (C) of FIG. 9, the difference between the part (C) of FIG. 9 and the part (D) of FIG. 6 is that the display module 200 in the part (C) of FIG. 9 further includes the transflective layer 226 disposed between the liquid crystal layer 208 and the first polarizer 210. As shown in the part (D) of FIG. 9, the difference between the part (D) and the part (C) of FIG. 9 is that the transflective layer 226 is disposed between the first polarizer 210 and the light converting layer 216.

To summarize the above descriptions, in at least one of the light emitting units in the backlight module, luminance of the light emitted from the light emitting unit greater than or equal to 30% maximum Lx that is within the spray angle is designed as the light emitted from the backlight module, and the spray angle is greater than or equal to 135 degrees and less than 180 degrees. Since the spray angle of the light emitted from the light emitting unit is greater than the beam angle of the light emitting unit in the conventional display device, more light from the light emitting unit can be used as the light emitted from the backlight module in this disclosure, and the light from the backlight module may be more uniform when the thickness of the backlight module is reduced. The protecting layer can cover the light emitting units or the controllers in the backlight module. The protecting layer can improve problems such as peeling or scratch issue of the light emitting units or the controllers by external forces, electric leakage, or electrostatic discharge (ESD) damage. A ratio of the third distance (distance between the first optical film and the light emitting unit) to the first thickness (thickness of the light emitting unit) is ranged from 1.5 to 75 to obtain better light exiting efficiency of the backlight module. In addition, LED distance per pixel distance (LDPPD) in this disclosure is ranged from 3 to 1000 to achieve better control of local dimming and have ability to adjust the brightness of a smaller region of pixels.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:
   a backlight module comprising a plurality of light emitting units, a base plate and at least one controller, wherein the plurality of light emitting units are disposed on a first surface of the base plate, the at least one controller is disposed on a second surface of the base plate, the second surface is opposite to the first surface, and at least one of the plurality of light emitting units is electrically connected to the at least one controller; and
   a display module disposed on the first surface of the base plate, wherein the plurality of light emitting units are disposed between the display module and the base plate,
   wherein the backlight module comprises a covering layer, an optical film, and a plurality of pins, and the covering layer is disposed on the first surface of the base plate,
   wherein the optical film is disposed on the plurality of pins,
   wherein the covering layer comprises an opening, and at least one of the plurality of pins is disposed in the opening,
   wherein the at least one of the plurality of pins comprises a flat surface, and the flat surface is contacted with the optical film.

2. The display device of claim 1, wherein the at least one of the plurality of light emitting units comprises a side surface and a top surface, the covering layer covers a portion of the side surface of the at least one of the plurality of light emitting units, and the covering layer exposes the top surface of the at least one of the plurality of light emitting units.

3. The display device of claim 1, wherein a thickness of the covering layer is less than a thickness of the at least one of the plurality of light emitting units.

4. The display device of claim 1, wherein the covering layer comprises a plurality of holes, and the plurality of light emitting units are disposed in the plurality of holes respectively.

5. The display device of claim 1, wherein the at least one of the plurality of light emitting units comprises a side surface and a top surface, and the covering layer covers the side surface and the top surface of the at least one of the plurality of light emitting units.

6. The display device of claim 1, wherein the at least one of the plurality of light emitting units is electrically connected to the at least one controller by a conductive line through a via hole penetrating through the base plate.

7. The display device of claim 1, wherein the backlight module further comprises a reflective layer disposed on a side surface and a top surface of the at least one of the plurality of pins.

8. The display device of claim 7, wherein a cavity is disposed between two adjacent pins of the plurality of pins, and the at least one of the plurality of light emitting units is disposed in the cavity.

9. The display device of claim 1, wherein the display module comprises a plurality of pixels, a distance between adjacent two of the plurality of light emitting units is defined as a first distance, and a distance between adjacent two of the plurality of pixels is defined as a second distance, wherein a ratio of the first distance to the second distance ranges from 3 to 1000.

10. The display device of claim 1, wherein a distance between the optical film and one of the plurality of light emitting units is defined as a third distance, and a thickness of the one of the plurality of light emitting units is defined as a first thickness, wherein a ratio of the third distance to the first thickness ranges from 1.5 to 75.

11. The display device of claim 1, wherein a distance between the optical film and the covering layer is defined as a fourth distance, and a thickness of one of the plurality of light emitting units is defined as a first thickness, wherein a ratio of the fourth distance to the first thickness ranges from 1.5 to 75.

12. The display device of claim 1, wherein the backlight module comprises a plurality of thin film transistors, the plurality of thin film transistors are disposed between the plurality of light emitting units and the base plate, and the at least one of the plurality of light emitting units is electrically connected to at least one of the plurality of thin film transistors.

13. The display device of claim 1, wherein the display module comprises:
   a first light converting layer disposed on the plurality of light emitting units;
   a first polarizer disposed on the backlight module;
   a second polarizer disposed on the first polarizer; and
   a liquid crystal layer disposed between the first polarizer and the second polarizer.

14. The display device of claim 13, wherein one of the first polarizer and the second polarizer is disposed between the first light converting layer and the liquid crystal layer.

15. The display device of claim 13, wherein the first light converting layer is disposed between the liquid crystal layer and the first polarizer.

16. The display device of claim 13, wherein the display device comprises a black matrix, and the liquid crystal layer is disposed between the first light converting layer and the black matrix.

17. The display device of claim 13, wherein the at least one of the plurality of light emitting units comprises a second light converting layer, and the second light converting layer comprises a plurality of quantum dots.

18. The display device of claim 13, wherein the display device comprises a transflective layer, and the first light converting layer is disposed between the transflective layer and the plurality of light emitting units.

19. The display device of claim 18, wherein the display module comprises a pixel and another pixel adjacent to the pixel, and the transflective layer is disposed on the pixel and is not disposed on the another pixel.

20. The display device of claim 1, wherein the base plate is a printed circuit board.

21. The display device of claim 20, wherein the plurality of light emitting units has a light emitting direction, the display module has a light output direction, and the light emitting direction and the light output direction are parallel.

22. The display device of claim 20, wherein the optical film is disposed between the plurality of pins and the display module.

* * * * *